United States Patent [19]

Sengoku

[11] 4,379,379
[45] Apr. 12, 1983

[54] DEVICE FOR FIXING A WINDOW MOLDING ONTO A WINDOWPANE

[75] Inventor: Ikuo Sengoku, Toyota, Japan

[73] Assignee: Toyota Jidosha Kogyo Kabushiki Kaisha, Aichi, Japan

[21] Appl. No.: 250,679

[22] Filed: Apr. 3, 1981

[30] Foreign Application Priority Data

Nov. 5, 1980 [JP] Japan .............................. 55-154570

[51] Int. Cl.³ .......................................... E04F 19/02
[52] U.S. Cl. ....................................... 52/208; 52/397; 52/401; 52/717
[58] Field of Search ................ 52/208, 397, 401, 717; 296/29, 84 R, 84 A, 84 D, 93

[56] References Cited

U.S. PATENT DOCUMENTS

| | | | |
|---|---|---|---|
| 3,245,182 | 4/1966 | Zierold | 52/208 |
| 3,413,770 | 12/1968 | Adams | 52/208 |
| 3,611,663 | 10/1971 | Andrey | 52/397 |
| 3,694,984 | 10/1972 | Schwartz | 52/401 |
| 3,851,433 | 12/1974 | Colucci | 52/717 |
| 3,968,613 | 7/1976 | Meyer | 52/717 |
| 4,143,906 | 3/1979 | Plourde | 296/840 |
| 4,147,005 | 4/1979 | Meyer | 52/717 |
| 4,170,855 | 10/1979 | Murray et al. | 52/717 |
| 4,249,356 | 2/1981 | Noso | 52/717 |
| 4,332,412 | 6/1982 | Nakazawa et al. | 52/208 |

FOREIGN PATENT DOCUMENTS

2756207 6/1979 Fed. Rep. of Germany ... 296/84 A

*Primary Examiner*—Peter M. Caun
*Attorney, Agent, or Firm*—Parkhurst & Oliff

[57] ABSTRACT

A windowpane assembly comprising a molding clip inserted between the circumferential end face of the windowpane and the riser portion of the fillister formed on a vehicle body for fixing a window molding onto the windowpane. The molding clip comprises a holding portion fitted into the window molding, a central base portion, a pair of V-shaped elastic wings, and a pair of latch claws formed on the corresponding elastic wings. Before the molding clip is inserted between the windowpane and the riser portion of the fillister, the latch claws are engaged with the latch tongue formed on the central base portion. When the molding clip is inserted between the windowpane and the riser portion of the fillister, the latch claws are automatically disengaged from the latch tongue and, as a result, the elastic wings come into engagement with the rear face of the windowpane.

18 Claims, 15 Drawing Figures

DEVICE FOR FIXING A WINDOW MOLDING ONTO A WINDOWPANE

DESCRIPTION OF THE INVENTION

The present invention relates to a device for fixing a windowpane, such as a windshield or a rear window of a vehicle, onto the body of a vehicle.

Figure 1:
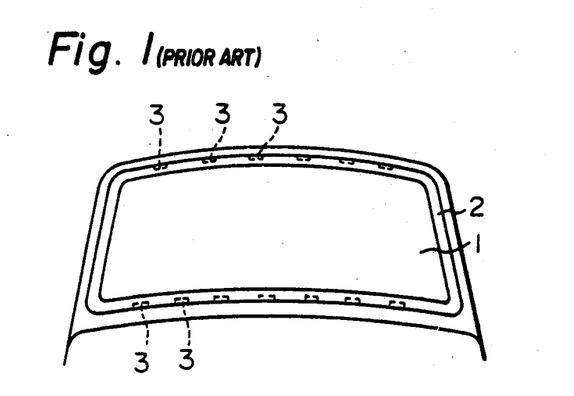
FIG. 1 is a front view of a windowshield of a vehicle.
Figure 2:
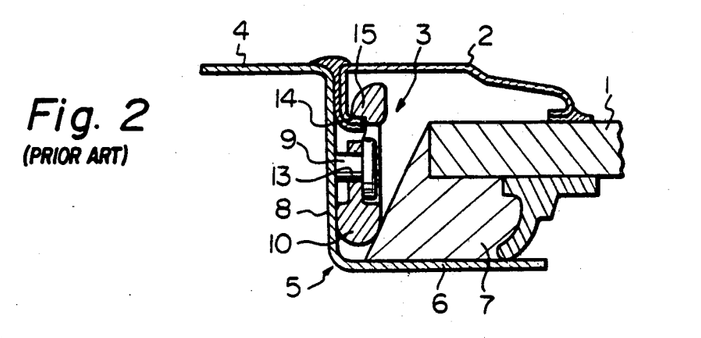
FIG. 2 is a cross-sectional side view of a conventional window molding fixing device.
Figure 3:
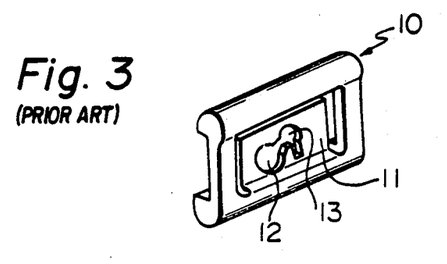
FIG. 3 is a perspective view of the clip illustrated in FIG. 2.

As illustrated in FIG. 1, in, for example, a windshield of a motor vehicle, the periphery of the windshield 1 is covered by a decorative window molding 2, and a plurality of window molding fixing devices 3 is attached onto the rear of the window molding 2. FIG. 2 illustrates a cross-section of such a conventional window molding fixing device 3. Referring to FIG. 2, the body panel 4 of a vehicle has a fillister 5 formed thereon for receiving the windshield 1, and the periphery of the windshield 1 is stuck onto the bottom wall 6 of the fillister 5 by means of an adhesive packing material 7. On the other hand, a T-shaped stud 9, having an enlarged head, is welded onto the riser portion 8 of the fillister 5, and a molding clip 10, made of a synthetic resin, is fitted onto the stud 9. As illustrated in FIG. 3, the molding clip 10 has an elastic deformable portion 11 at the central portion thereof, and an increased diameter hole 12 and a reduced diameter hole 13, which are interconnected to each other, are formed on the elastic deformable portion 11. The molding clip 10 is secured onto the riser portion 8 of the fillister 5 as illustrated in FIG. 2 in such a way that, firstly, the larger diameter hole 12 of the molding clip 10 is inserted into the stud 9 and, then, the smaller diameter hole 13 of the molding clip 10 is fitted onto the stud 9. After this, the outer peripheral portion 14 of the molding clip 10 is fitted into the underside of the claw 15 by striking the window molding 2 with a hammer and, thus, the window molding 2 is fixed onto the windshield 1.

However, in such a conventional window molding fixing device 3, it is necessary to weld a plurality of the studs 9 onto the riser portion 8 of the fillister 5, which takes a long time and, as a result, a problem occurs in that the manufacturing time period and cost is increased. In addition, the window molding 2 is secured into the molding clip 10 in such a way that the outer peripheral portion 14 of the molding clip 10 is fitted into the underside of the claw 15 by striking the window molding 2 with a hammer, as mentioned above. Consequently, at this time, there is a possibility the painted surface of the body panel 4 will be damaged by the window molding 2.

An object of the present invention is to provide a window molding fixing device which is capable of fixing the window molding easily and securely onto a windowpane without using the T-shaped stud and which is free from causing damage to the painted surface of the body panel.

According to the present invention, there is provided a windowpane assembly of a vehicle, which has a window molding and a windowpane arranged in an L-shaped cross-sectional fillister of a vehicle body, said fillister extending along an outer periphery of the windowpane and comprising a riser portion which extends inwardly from the vehicle body, and a bottom portion which extends substantially parallel to the vehicle body from an inner end of said riser portion, the windowpane being stuck onto the bottom portion by means of an adhesive material, a gap formed between the riser portion and the outer periphery of the windowpane being covered by the window molding which has a substantially C-shaped cross-section, said device having a molding clip inserted into the gap for fixing the window molding onto the windowpane, said molding clip comprising: a holding portion engageable with the C-shaped cross-section of said window molding; a central base portion connected to said holding portion and extending substantially perpendicular to said holding portion towards the bottom portion of said fillister; a pair of V-shaped elastic wings intended to resiliently abut against the outer periphery of said windowpane within said gap and extending outwardly from said central base portion in an opposite direction, each of said elastic wings comprising a first wing portion which extends outwardly from said central base portion along the riser portion of said fillister and has an outermost end, and a second wing portion which extends inwardly from said outermost end; latch means arranged on said second wing portions and being engageable with said central base portion for maintaining said elastic wings in a compressed state to accumulate the elastic force of said elastic wings, and; disengaging means for disengaging said latch means from said central base portion and causing said elastic wings to resiliently abut against the outer periphery of said windowpane.

The present invention may be more fully understood from the description of preferred embodiments of the invention set forth below, together with the accompanying drawings.

DESCRIPTION OF PREFERRED EMBODIMENTS

Figure 4:
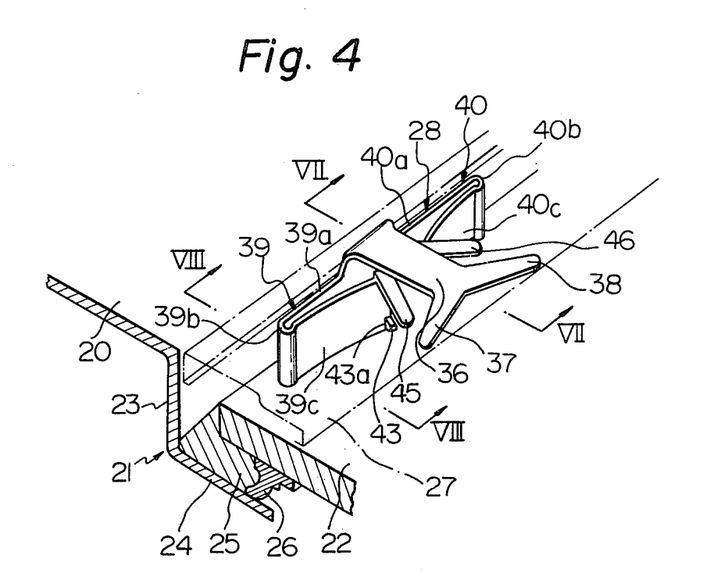
FIG. 4 is a perspective view of an embodiment of a window molding fixing device according to the present invention.

Referring to FIG. 4, 20 designates a body panel exposed to the exterior of a vehicle, and 21 a fillister having an L-shaped cross-section for receiving a windowpane 22 therein. The fillister 21 comprises a riser portion 23 extending inwardly from the edge of the body panel 20 and substantially perpendicular to the body panel 20, and a bottom wall portion 24 extending from the inner end of the riser portion 23 parallel to the body panel 20. The windowpane 22 is stuck onto the bottom wall portion 24 by means of an adhesive packing material 25 which has a resiliency when it is hardened. In addition, a dam member 26 is mounted on the rear face of the windowpane 22 for preventing the outflow of the adhesive packing material 25 when the windowpane 22 is stuck onto the bottom wall portion 24 by using the adhesive packing material 25. FIG. 4 illustrates the interior of a window molding 27 having a generally C-shaped cross-section and the window molding 27 is depicted by a line of short and long dashes.

Figure 5:
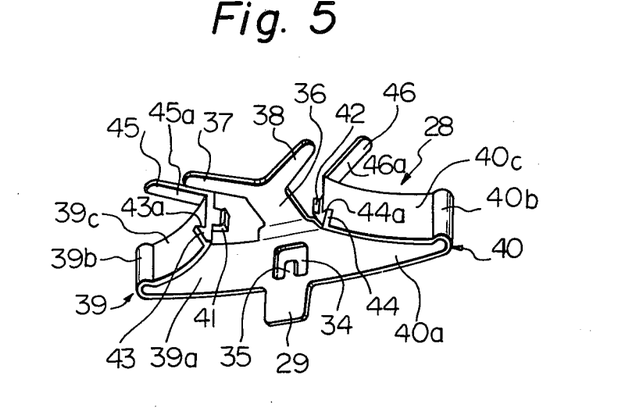
FIG. 5 is a perspective view of the molding clip illustrated in FIG. 4.
Figure 6:
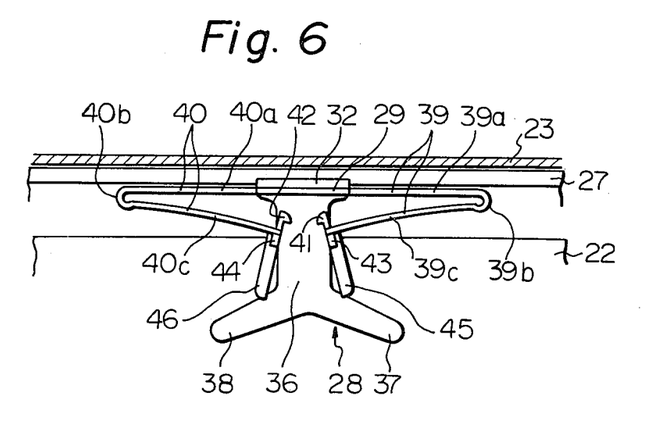
FIG. 6 is a bottom view of FIG. 4.
Figure 7:
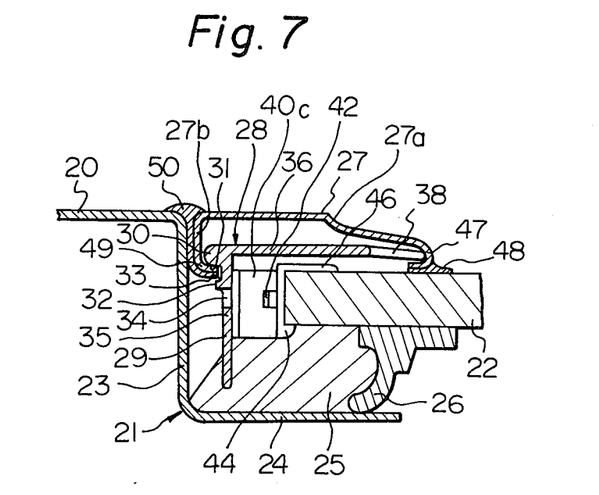
FIG. 7 is a cross-sectional side view taken along the line VII—VII in FIG. 4.
Figures 8, 9, 10, 11:
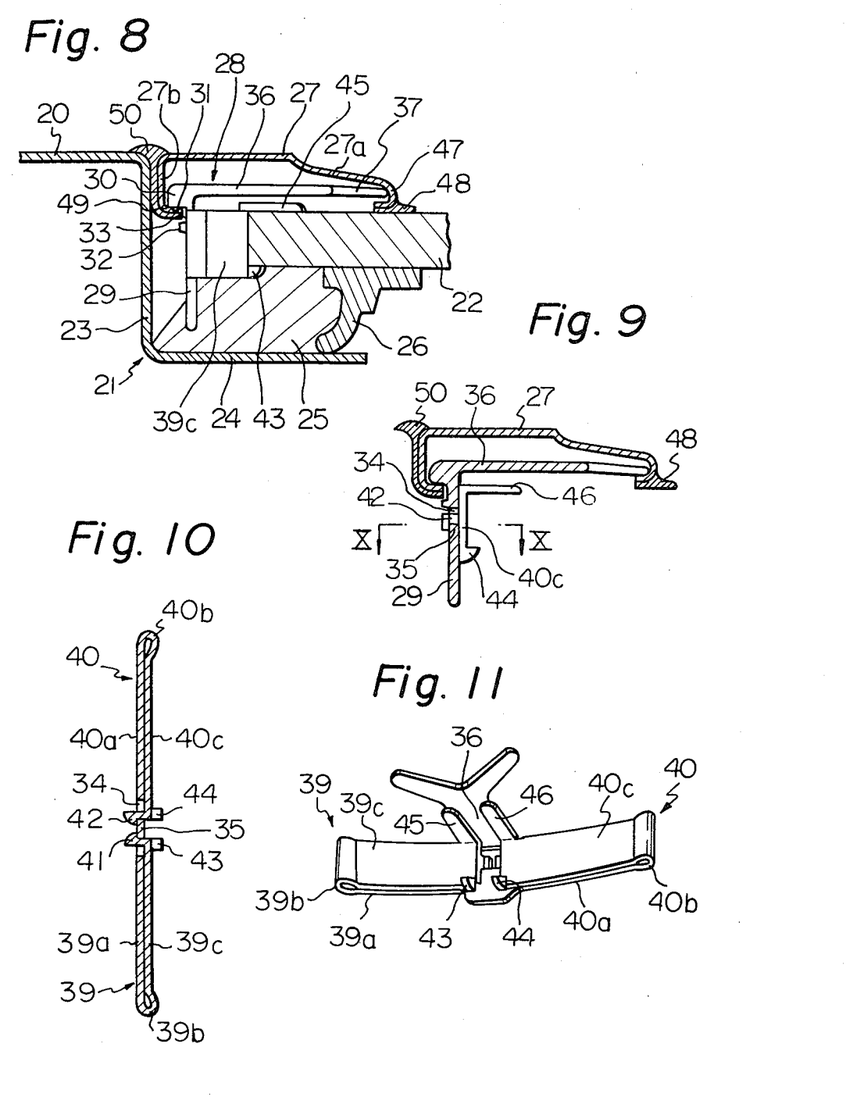
FIG. 8 is a cross-sectional side view taken along the line VIII—VIII in FIG. 4.
FIG. 9 is a cross-sectional side view of a molding clip fixed onto a window molding.
FIG. 10 is a cross-sectional view taken along the line X—X in FIG. 9.
FIG. 11 is a perspective view of the molding clip illustrated in FIG. 9.

FIGS. 4, 6, 7 and 8 illustrate the state wherein the window molding 27 is fixed onto the windowpane 22 by means of a molding clip 28 according to the present invention, and FIG. 5 illustrates only the molding clip 28 of FIG. 4. Referring to FIGS. 4 through 8, the molding clip 28 comprises a rectangular shaped flat central base portion 29 extending substantially parallel to the riser portion 23, and a projection 30, projecting towards the riser portion 23, is formed in one piece on the upper end of the central base portion 29. As illustrated in FIGS. 7 and 8, the projection 30 has a flat lower face 31 extending substantially perpendicular to the central base portion 29, and another projection 32, slightly spaced from the projection 30, is formed on the central base portion 29 beneath the flat lower face 31 of the projection 30. Consequently, a groove 33, having a U-shaped cross-section and extending parallel to the periphery of the windowpane 22, is formed between the projections 30 and 32. In addition, as illustrated in FIG. 5, an opening 34 is formed on the central base portion 29, and a latch tongue 35 projects into the opening 34.

As illustrated in FIGS. 4 through 8, the molding clip 28 has a flat holding portion 36 extending perpendicular to the central base portion 29 from the top of the central base portion 29, and the holding portion 36 has a pair or elastic horns 37, 38 formed in one piece on the tip of the holding portion 36 and outwardly extending in opposite directions. In addition, the central base portion 29 has a pair of substantially V-shaped elastic wings 39, 40 extending outwardly from the central base portion 29 in opposite directions along the riser portion 23 of the fillister 21 and then are doubled back to bend inwardly. As illustrated in FIGS. 4 through 6, the elastic wings 39 and 40 comprise first wing portions 39a and 40a extending parallel to the riser portion 23 of the fillister 21 from the central base portion 29, bending portions 39b and 40b located at the outermost of the first wing portions 39a, 40a, and second wing portions 39c and 40c extending inwardly from the bending portions 39b and 40b, respectively. Consequently, in a free state as illustrated in FIG. 5, the first wing portion 39a and the second wing portion 39c constitute the V-shaped elastic wing 39, and the first wing portion 40a and the second wing portion 40c constitute the V-shaped elastic wing 40. Latch claws 41 and 42, each being engageable with the latch tongue 35, are formed on the inner walls of the tips of the second wing portions 39c and 40c, respectively. In addition, claws 43 and 44, each being engageable with the periphery of the rear face of the windowpane 22, are formed on the outer walls of the tips of the second wing portions 39c 40c at a position opposite to the latch claws 41 and 42, respectively, and disengaging arms 45 and 46, each being engageable with the periphery of the front face of the windowpane 22, are formed on the outer walls of the second wing portions 39c and 40c above the claws 43 and 44, respectively. The claws 43 and 44 have flat engaging faces 43a and 44a extending perpendicular to the outer walls of the second wing portions 39c and 40c, respectively, and the disengaging arms 45 and 46 have flat engaging faces 45a and 46a extending perpendicular to the outer walls of the second wing portions 39c and 40c, respectively. The distance between the claw 43 and the corresponding disengaging arm 45 and the distance between the claw 44 and the corresponding disengaging arm 46 is slightly larger than the thickness of the windowpane 22, and the disengaging arms 45 and 46 have a length which is rather longer than that of the claws 43 and 44.

As illustrated in FIGS. 7 and 8, the window molding 27 comprises a front portion 27a extending substantially parallel to the windowpane 22 and exposed to the exterior of the vehicle, and a bending portion 27b extending downwardly from the outer circumferential edge of the front portion 27a and substantially perpendicular to the front portion 27a. The inner circumferential edge 47 of the front portion 27a of the window molding 27 is bent inward in the form of a C-shaped cross-section, and a rubber member 48 for protection is stuck onto the outer wall of the inner circumferential edge 47 of the front portion 27a. On the other hand, the lower edge portion 49 of the bending portion 27b of the window molding 27 is bent in the form of an L-shaped cross-section, and a rubber member 50 for protection is stuck onto the outer wall of the bearing portion 27b.

Figure 12:
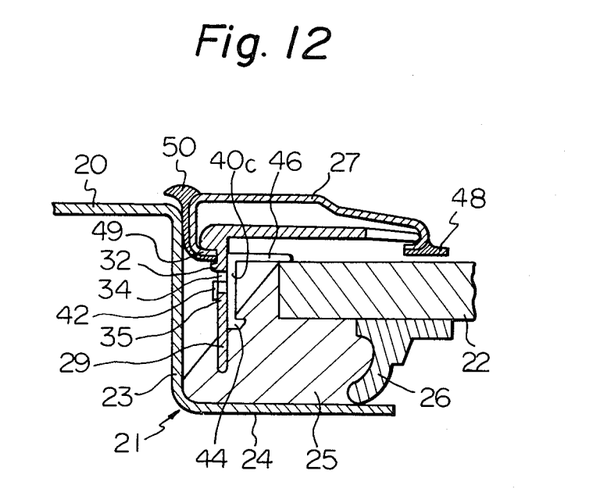
FIG. 12 is a cross-sectional side view illustrating the same cross-section as that of FIG. 8 and illustrating the initial stage of the insertion of the molding clip.

The windowpane 22 is stuck onto the bottom wall portion 24 of the fillister 21 by means of the adhesive packing material 25 as mentioned above and, then, the window molding 27 is fixed onto the windowpane 22 by means of the molding clip 28 before the adhesive packing material 25 is hardened. As mentioned above, the elastic wings 39, 40 of the molding clip 28 have a V-shape in a free state as illustrated in FIG. 5. Each elastic horn 37, 38 of the holding portion 36 of the molding clip 28 is fitted into the C-shaped cross-section of the inner circumferential edge 47 of the window molding 27 in such a free state. Then, the holding portion 36 of the molding clip 28 is inserted into the C-shaped cross-section of the window molding 27 while elastically deforming the elastic horns 37, 38, and the lower edge portion 49 of the window molding 27 is fitted into the groove 33 of the central base portion 29. After this, the second wing portions 39c, 40c of the elastic wings 39, 40 are pushed towards the latch tongue 35 projecting into the opening 34 against the elastic force of the elastic wings 39, 40 and, then, the latch claws 41, 42 of the elastic wings 39, 40 are engaged with the latch tongue 35 by a snapping action, as illustrated in FIGS. 9 through 11. However, instead of engaging the latch claws 41, 42 with the latch tongue 35 after the holding portion 36 of the molding clip 28 is inserted into the window molding 27, as mentioned above, the holding portion 36 of the molding clip 28 may be inserted into the window molding 27 after the latch claws 41, 42 are engaged with the latch tongue 35. FIG. 11 illustrates the molding clip 28 in which the latch claws 41, 42 are engaged with the latch tongue 35. Then, the molding clip 28, supported by the window molding 27, is inserted between the circumferential end face of the windowpane 22 and the riser portion 23 of the fillister 21. As this time, firstly, the disengaging arms 45, 46, formed on the second wing portions 39c, 40c of the elastic wings 39, 40, abut against the front face of the windowpane 22 as illustrated in FIG. 12. After this, when the molding clip 28 is further pushed together with the window molding 27, since the lower edge portion 49 of the window molding 27 comes into engagement with the projection 32 and, thereby, the central base portions 29 is pushed down, the latch tongue 35, formed on the central base portion 29, is pushed down. However, at this time, since the disengaging arms 45, 46 abut against the windowpane 22, the tips of the second wing portions 39c, 40c of the elastic wings 39, 40 cannot move downward and, thus, the latch claws 41, 42 of the second wing portions 39c, 40c cannot move downward. Consequently, when the molding clip 28 is further pushed down, the latch claws 41, 24 are disengaged from the latch tongue 35 and, thus, the elastic wings 39, 40 are returned to a state as illustrated in FIG. 5 due to the elastic force of the elastic wings 39, 40. As a result of this, as illustrated in FIGS. 4, 6, 7 and 8, the elastic wings 39, 40 enter into the adhesive packing material 25 which has not been hardened, and the outer ends of the elastic wings 39, 40 resiliently abut against the circumferential end face of the windowpane 22. At this time, the claws 43, 44 of the elastic wings 39, 40 come into engagement with the periphery of the rear face of the windowpane 22. As a result of this, the window molding 27 is fixed onto the windowpane 22 by the claws 43, 44 of the elastic wings 39, 40.

Figure 13:
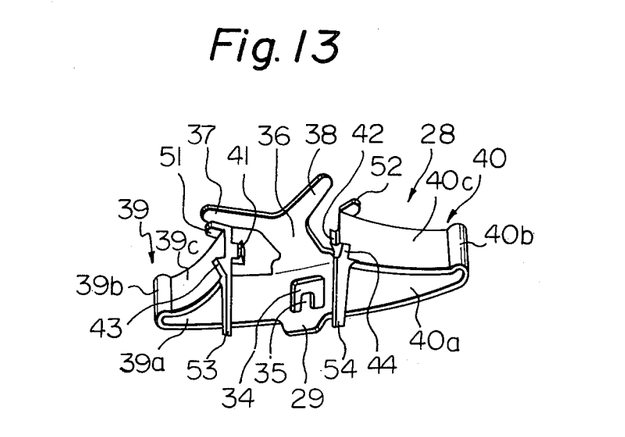
FIG. 13 is a perspective view of an alternative embodiment according to the present invention.
Figure 14:
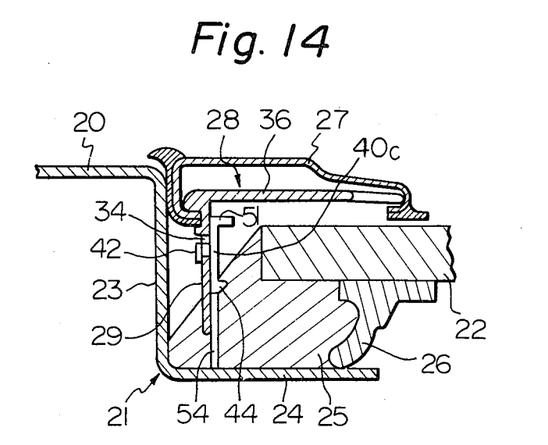
FIG. 14 is a cross-sectional side view illustrating the initial stage of the insertion of the molding clip illustrated in FIG. 13.
Figure 15:
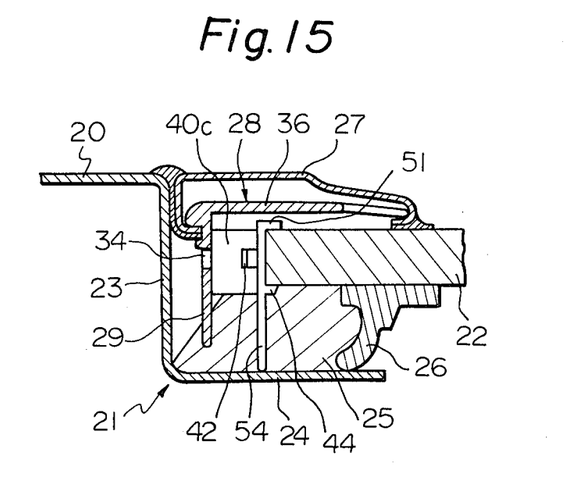
FIG. 15 is a cross-sectional side view, illustrating the molding clip, illustrated in FIG. 13, the insertion of which is completed.

FIGS. 13 through 15 illustrate an alternative embodiment. In FIGS. 13 through 15, similar components are indicated with the same reference numerals used in FIGS. 4 through 12. Referring to FIGS. 13 through 15, in this embodiment, claws 51 and 52, each being engageable with the front face of the windowpane 22, are formed on the outer walls of the tips of the second wing portions 39c and 40c above the claws 43 and 44, respectively. The claws 51 and 52 have a length which is slightly longer than that of the claws 43 and 44 and, thus, the length of the claws 51 and 52 is rather shorter than that of the disengaging arms 45 and 46 illustrated in FIGS. 4 through 12. In addition, downwardly extending disengaging arms 53 and 54 are formed in one piece on the lower ends of the tips of the second wing portions 39c and 40c respectively. In this embodiment, as in the same manner as described with reference to FIGS. 4 through 12, firstly, the latch claws 41, 42 of the elastic wings 39, 40 are engaged with the latch tongue 35 after the holding portion 36 of the molding clip 28 is fitted into the C-shaped cross-section of the window molding 27 as illustrated in FIG. 13. Then, the molding clip 28, supported by the window molding 27, is inserted between the circumferential end face of the windowpane 22 and the riser portion 23 of the fillister 21 and, as a result, the disengaging arms 53 and 54 abut against the bottom wall portion 24 of the fillister 21 as illustrated in FIG. 14. After this, as the window molding 27 is pushed down, the latch tongue 35 moves downward relative to the latch claws 41, 42. Then, the latch claws 41, 42 are disengaged from the latch tongue 35 and thus, the elastic wings 39, 40 are returned to an initial state due to the elastic force of the elastic wings 39, 40. As a result of this, as illustrated in FIG. 15, the claws 43, 44 of the elastic wings 39, 40 come into engagement with the periphery of the rear face of the windowpane 22, and the claws 51, 52 of the elastic wings 39, 40 come into engagement with the periphery of the front face of the windowpane 22.

In the embodiments illustrated in FIGS. 4 through 12 and in FIGS. 13 through 15, the molding clip 28 is made, in one piece, of a synthetic resin, such as a polyamide or a polyacetal. In addition, in order to obtain a further higher elasticity, metallic spring plates may be embedded in the elastic wings 39, 40. Furthermore, the entirety of the molding clip 28 may be made, in one piece, of a metallic material.

According to the present invention, since it is not necessary to weld a T-shaped stud to the riser portion of the fillister, as in a prior art, it is possible to reduce the length of time which is necessary to attach the window molding to the windowpane. In addition, after the molding clip is inserted between the circumferential end face of the windowpane and the riser portion of the fillister, the window molding can be fixed onto the windowpane by putting a slight force on the window molding, which force is necessary to disengage the latch claws from the latch tongue. Consequently, it is possible to prevent the painted surface of the body panel from being damaged when the window molding is fixed onto the windowpane. Furthermore, since the elastic force of the elastic wings has a slight influence on the force which is necessary to push the window molding into the fillister, it is possible to considerably strengthen the elastic force of the elastic wings and, thus, the force of holding the window molding can be increased as compared with that in a prior art. In addition, in the present invention, when the latch claws are engaged with the latch tongue, the transverse width of the molding clip becomes rather thin. Furthermore, when the latch claws are disengaged from the latch tongue, the claws of the elastic wings are able to come into engagement with the periphery of the rear face of the windowpane independently of the distance between the elastic wings and the circumferential end face of the windowpane. Consequently, even if a considerable irregularity in the distance between the circumferential end face of the windowpane and the riser portion of the fillister is present, it is possible to securely fix the window molding onto the windowpane. In addition, in the present invention, the elastic wing has a double spring construction comprising a first wing portion and a second wing portion, and the second wing portion has mainly a spring function. However, since the first wing portion also has a spring function, when the latch claws of the second wing portions are engaged with the latch tongue, the first wing portions can be deformed. As a result of this, when the latch claws of the second wing portions are engaged with the latch tongue, it is possible to reduce the stress produced in the second wing portions. Therefore, particularly in the case wherein the molding clip is made of synthetic resin, it is possible to suppress reduction in the spring force of the second wing portions. In addition, in the present invention, the latch claws are disengaged from the latch tongue by lifting the tips of the second wing portions. However, since each of the wings comprises a first wing portion and a second wing portion, each of the wings has a rather long length. As a result of this, it is possible to easily lift the tips of the second wing portions and, thus, the latch claws can be easily engaged with and disengaged from the latch tongue.

While the invention has been described by reference to specific embodiments chosen for purposes of illustration, it should be apparent that numerous modifications could be made thereto by those skilled in the art without departing from the basic, concept and scope of the invention.

I claim:

1. A windowpane assembly of a vehicle, which has a window molding and a windowpane arranged in an L-shaped cross-sectional fillister of a vehicle body, said fillister extending along an outer periphery of the windowpane and comprising a riser portion which extends inwardly from the vehicle body, and a bottom portion which extends substantially parallel to the vehicle body from an inner end of said riser portion, the windowpane being stuck onto the bottom portion by means of an adhesive material, a gap formed between the riser portion and the outer periphery of the windowpane being covered by the window molding which has a substantially C-shaped cross-section, said device having a molding clip inserted into the gap for fixing the window molding onto the windowpane, said molding clip comprising:

a holding portion engageable with the C-shaped cross-section of said window molding;

a central base portion connected to said holding portion and extending substantially perpendicular to said holding portion towards the bottom portion of said fillister;

a pair of V-shaped elastic wings intended to resiliently abut against the outer periphery of said windowpane within said gap and extending outwardly from said central base portion in opposite directions, each of said elastic wings comprising a first wing portion which extends outwardly from said central base portion along the riser portion of said fillister and has an outermost end, and a second wing portion which extends inwardly from said outermost end;

latch means arranged on said second wing portions and being engageable with said central base portion for maintaining said elastic wings in a compressed state to accumulate the elastic force of said elastic wings, and;

disengaging means for disengaging said latch means from said central base portion and causing said elastic wings to resiliently abut against the outer periphery of said windowpane.

2. A windowpane assembly as claimed in claim 1, wherein the C-shaped cross-section of said window molding has opposed end portions, and the holding portion of said molding clip has a pair of engaging ends, each being in engagement with the corresponding one of the opposed end portions of said window molding.

3. A windowpane assembly as claimed in claim 2, wherein at least one of said engaging ends has elasticity.

4. A windowpane assembly as claimed in claim 1, wherein each of said second wing portions has a claw which is engageable with a peripheral rear face of said windowpane.

5. A windowpane assembly as claimed in claim 4, wherein each of said second wing portions has an end portion which is able to resiliently abut against a circumferential end face formed on the outer periphery of said windowpane.

6. A windowpane assembly as claimed in claim 1, wherein each of said elastic wings is made of an elastic material.

7. A windowpane assembly as claimed in claim 1, wherein said latch means comprises a pair of latch claws, each being formed on said second wing portions and engageable with said central base portion.

8. A windowpane assembly as claimed in claim 7, wherein each of said latch claws is formed on an innermost end of said corresponding second wing portion.

9. A windowpane assembly as claimed in claim 7, wherein said central base portion has a latch tongue which is engageable with said latch claws.

10. A windowpane assembly as claimed in claim 1, wherein said disengaging means comprises a pair of disengaging members, each being formed on said corresponding second wing portion and engageable with a stationary member connected to the vehicle body.

11. A windowpane assembly as claimed in claim 10, wherein each of said disengaging members is formed on an innermost end of said corresponding second wing portion.

12. A windowpane assembly as claimed in claim 10, wherein each of said disengaging members is arranged to be engageable with the front surface of said windowpane.

13. A windowpane assembly as claimed in claim 10, wherein each of said disengaging members is arranged to be engageable with the fillister.

14. A windowpane assembly as claimed in claim 13, wherein each of said second wing portions has a claw which is engageable with the front surface of said windowpane.

15. A windowpane assembly as claimed in claim 1, wherein said molding clip is formed in one piece.

16. A windowpane assembly as claimed in claim 15, wherein said molding clip is made of a synthetic resin.

17. A windowpane assembly as claimed in claim 16, wherein said molding clip has a portion in which a metallic plate is embedded.

18. A windowpane assembly as claimed in claim 15, wherein said molding clip is made of a metallic material.

* * * * *